United States Patent
Farges

(10) Patent No.: US 9,046,167 B2
(45) Date of Patent: Jun. 2, 2015

(54) DEVICE FOR DETECTING THE NEUTRAL POSITION OF A LEVER FOR CONTROLLING SHIFTING AND SELECTING GEARS IN A MOTOR VEHICLE GEARBOX

(75) Inventor: Thomas Farges, Gometz-le-Chatel (FR)

(73) Assignee: DURA AUTOMOTIVE SYSTEMS SAS, Bievres (FR)

( * ) Notice: Subject to any disclaimer, the term of this patent is extended or adjusted under 35 U.S.C. 154(b) by 278 days.

(21) Appl. No.: 13/577,499

(22) PCT Filed: Feb. 9, 2011

(86) PCT No.: PCT/FR2011/050268
§ 371 (c)(1),
(2), (4) Date: Oct. 17, 2012

(87) PCT Pub. No.: WO2011/098721
PCT Pub. Date: Aug. 18, 2011

(65) Prior Publication Data
US 2013/0031999 A1    Feb. 7, 2013

(30) Foreign Application Priority Data
Feb. 11, 2010  (FR) ...................................... 10 50959

(51) Int. Cl.
*B60W 10/04*    (2006.01)
*F16H 59/04*    (2006.01)
*F16H 63/50*    (2006.01)
*B60W 10/06*    (2006.01)
*G01D 5/14*     (2006.01)
(Continued)

(52) U.S. Cl.
CPC .......... *F16H 59/044* (2013.01); *Y10T 74/2003* (2015.01); *F16H 63/502* (2013.01); *B60W 10/06* (2013.01); *F16H 2059/6823* (2013.01); *G01D 5/145* (2013.01); *F16H 2059/0269* (2013.01)

(58) Field of Classification Search
CPC ............................ F16H 63/502; B60W 10/06
USPC .................................................... 477/109, 112
See application file for complete search history.

(56) References Cited

U.S. PATENT DOCUMENTS

| 4,519,266 A | 5/1985 | Reinecke |
| 6,027,426 A | 2/2000 | Holman |

(Continued)

FOREIGN PATENT DOCUMENTS

| DE | 197 49 330 A1 | 5/1999 |
| DE | 10 2006 053 515 A1 | 5/2008 |
| DE | 10 2007 026303 A1 | 12/2008 |

(Continued)

OTHER PUBLICATIONS

International Search Report for PCT/FR2011/050268 dated Mar. 30, 2011.

*Primary Examiner* — Derek D Knight
(74) *Attorney, Agent, or Firm* — Heslin Rothenberg Farley & Mesiti P.C.

(57) ABSTRACT

The lever is mounted such as to be capable of moving relative to a detector suitable for detecting lever movements and for sending electrical signals to a processing unit. The detector comprises an axially magnetized cylindrical magnet positioned according to the axis of rotation and selection of the lever corresponding to the selection of gears, and a sensor arranged opposite the magnet, such that the signal is independent of the angular position of the lever about the gear-selection axis.

8 Claims, 1 Drawing Sheet

(51) Int. Cl.
*F16H 59/68* (2006.01)
*F16H 59/02* (2006.01)

(56) References Cited

U.S. PATENT DOCUMENTS

2007/0040803 A1* 2/2007 Dider et al. .................. 345/161

2008/0078604 A1* 4/2008 Ersoy et al. .................. 180/336

FOREIGN PATENT DOCUMENTS

| FR | 2 930 309 | A1 | 10/2009 |
| FR | 2 934 345 | A1 | 1/2010 |
| WO | 2008/155289 | A1 | 12/2008 |
| WO | 2009/141807 | A1 | 11/2009 |

* cited by examiner

DEVICE FOR DETECTING THE NEUTRAL POSITION OF A LEVER FOR CONTROLLING SHIFTING AND SELECTING GEARS IN A MOTOR VEHICLE GEARBOX

CROSS REFERENCE TO RELATED APPLICATIONS

This application is a national stage filing under section 371 of International Application No. PCT/FR2011/050268 filed on Feb. 9, 2011, and published in French on Aug. 18, 2011 as WO 2011/098721 and claims priority of French application No. 1050959 filed on Feb. 11, 2010, the entire disclosure of these applications being hereby incorporated herein by reference.

BACKGROUND ART

The invention relates to the technical field of motor vehicle gearboxes.

To be more specific, the invention relates to a device for detecting the neutral position of a control lever and can be used to particular advantage in a mechanical gearbox.

In a manner fully understood by those skilled in the art, the lever, or some other actuator member, is generally mounted, such as to be capable of angular movement, in a carrier housing secured to the interior of the vehicle. The lever is arranged to control selecting and shifting the gears.

Various solutions have been put forward for detecting the position of the lever so as to get to know the movements thereof and, consequently, its exact position in space. For example, document FR 2,930,309, which is also owned by the applicant of the present invention, relates to a device suitable for providing accurate information as to the various positions and directions of movement of the control lever.

To this end, a Hall effect sensor is mounted onto a fixed portion of the carrier housing in which the lever is articulated, opposite a magnet carried by said lever, in order to show the various movements and positions taken up by the lever, along three perpendicular axes x, y, z.

Starting from this basic concept, the problem the invention sets out to resolve is that of being able, in a straightforward and effective manner, to detect the position of the lever, particularly at the neutral point, something which proves important for vehicles fitted with systems suitable for cutting off the power supply to the drive motor when the vehicle is stopped for a preset length of time, so as to allow the vehicle to start again when the driver presses the accelerator pedal.

The use of a gearbox position sensor emitting an output signal representing the position of the neutral point is treated as known in document WO 2008/155289. To be more specific, the purpose of this document is to continually verify the integrity of the emitted output signal, whatever type of fault may occur.

To meet this objective, said document proposes combining the position sensor with a signal processing unit comprising an analogue-to-digital converter suitable for converting the analogue signal into a digital output signal in order to provide pre-specified periodic data corresponding to the position of the neutral point when two conditions are satisfied at the same time, namely that a magnet is in the neutral point position and the sensor is in a normal state of operation.

Based on this prior art, and in particular supplementary to the teaching in document FR 2,930,309, it seemed important to specify the nature and positioning of the means suitable for detecting the movements of the lever, so as to be completely separate from the movement of the lever corresponding to gear selection, which means that the neutral point can be detected straightforwardly, in a secure and effective manner.

BRIEF SUMMARY OF THE INVENTION

To resolve said problem, a device has been designed and perfected for detecting the neutral position of a control and selection lever in a motor vehicle gearbox mounted such as to be capable of moving relative to means suitable for detecting said movements and for sending electrical signals to a processing unit.

According to the invention, the means comprise an axially magnetised cylindrical magnet positioned according to the axis of rotation of the lever corresponding to the selection of gears and a sensor arranged opposite said magnet.

Another problem the invention sets out to resolve is that of having a maximum magnetic field over the reduced range of the zone corresponding to the neutral point, so as to improve measurement accuracy.

To resolve said problem, the sensor is arranged opposite the magnet, in the neutral point position.

To advantage, the sensor is a unidirectional Hall-effect probe. The magnet is built into a hinge and ball joint of the lever, while the sensor is mounted onto a fixed portion, such as the carrier in which said lever is articulated.

As indicated, the invention is of particular use when the vehicle is fitted with a so-called STOP AND START system as associated with a manual gearbox.

To this end, when the position of the magnet opposite the sensor is detected, at the end of a set time, an electrical signal is sent to the processing unit to allow for a possible cut in the power supply to the vehicle drive motor.

BRIEF DESCRIPTION OF DRAWING FIGURES

The invention is disclosed hereinafter in further detail with the help of the figures in the appended drawings wherein.

DETAILED DESCRIPTION

Figure 1:
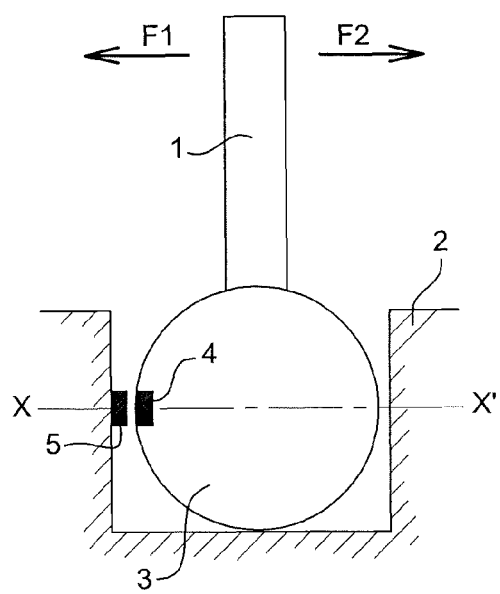
FIG. 1 is a purely diagrammatic view showing the mounting of the cylindrical magnet in the hinge and ball joint of the lever and the positioning thereof relative to the sensor mounted onto a fixed portion, the axis x-x' corresponding to the gear-selection axis.
Figure 2:
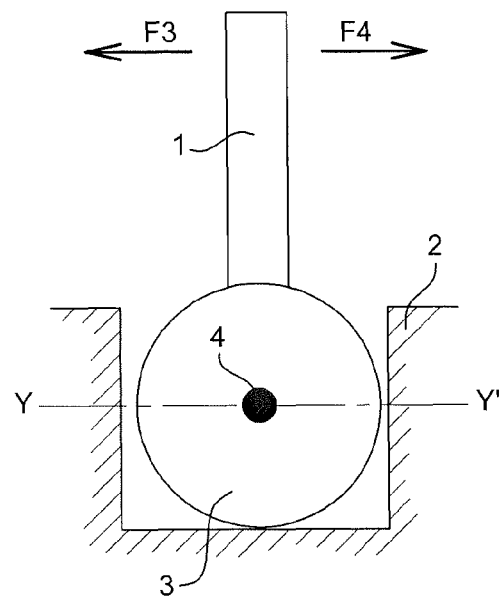
FIG. 2 is a side view corresponding to FIG. 1, the axis y-y' corresponding to the gear-shift axis.

In a manner that is fully understood by those skilled in the art, the control lever (1), for controlling the shifting and selecting of the gears, is mounted such as to be capable of angular movement in a carrier housing (2), for example. The lever (1) is mounted such as to be capable of angular movement by means of a hinge and ball joint (3). The foot of the lever (1) is arranged so as to be connected to any type of actuator, for shifting and selecting the gears.

In the figures, and as already stated, x-x' corresponds to the selection axis, y-y' corresponds to the shift axis, while the arrows F1 and F2 correspond to the direction of movement of the lever (1) for shifting the gears and the arrows F3 and F4 correspond to the movement of the lever (1) for selecting the gears.

According to the invention, in order to detect the neutral position of the lever (1), an axially magnetised cylindrical magnet (4) is positioned according to the axis of selection, x-x', of the lever (1) corresponding to the selection of gears. The magnet (4) is built into the hinge and ball joint (3) and is therefore arranged coaxially to the axis x-x'. Opposite the magnet (4) is arranged a sensor (5) mounted onto a fixed portion, and in particular onto a portion of the housing (2). The sensor (5) comprises to advantage a Hall-effect probe.

Significantly, given the positioning of the magnet (4), in a manner coaxial to the axis of selection x-x', changes in the magnetic field picked up by the Hall-effect probe (5) are independent of the selection motion symbolised by the arrows F3 and F4. The result is that changes in the magnetic field are unidirectional and strictly related to the shift motion of the lever, symbolised by the arrows F1 and F2. In other words, the electrical signal is separate from the position of the lever along the axis of selection x-x'.

To advantage, the Hall-effect probe (5) is located opposite the magnet (4) in the neutral position of the lever (1).

These arrangements are used to give the maximum magnetic field over the reduced range of the neutral point zone thereby improving measurement accuracy.

In a known way, the signals emitted by the sensor (4)-probe (5) assembly are sent to a processing unit.

The invention is of particular use when the vehicle is fitted with a STOP AND START system associated with a manual gearbox. Thus, when the position of the magnet (4), opposite the probe (5), is detected, at the end of a preset time, an electrical signal is sent to the processing unit to allow for a possible cut in the power supply to the vehicle drive motor.

The advantages are clear from the description. In particular, it should be stressed and restated that one unidirectional probe is sufficient in order to detect the movement of the lever in shift and, consequently, to supply a signal allowing the neutral point position to be detected.

The invention claimed is:

1. Device for detecting neutral position of a lever for controlling shifting and selecting gears in a motor vehicle gearbox, mounted such as to be capable of movement relative to means suitable for detecting said movement and for sending an electrical signal to a processing unit, wherein the means comprise an axially magnetised magnet positioned according to a gear-selection axis of rotation of the lever corresponding to the selection of gears, and a sensor arranged opposite said magnet, such that said signal is independent of angular position of the lever about the gear-selection axis, and wherein when a position of the magnet opposite the sensor is detected, at an end of a preset time, an electrical signal is sent to the processing unit to cut power supply to a drive motor of the vehicle.

2. The device as claimed in claim 1, wherein the sensor is arranged opposite the magnet, in the neutral position.

3. The device as claimed in one of claim 1, wherein the sensor comprises a unidirectional Hall-effect probe.

4. The device as claimed in claim 1, wherein the signal reflects unidirectional changes in magnetic field related solely to gear shift motion of the lever.

5. The device as claimed in claim 1, in combination with the lever for controlling shifting and selecting gears in a motor vehicle gearbox.

6. The device as claimed in claim 1, wherein the magnet is built into a hinge and ball joint of the lever, while the sensor is mounted onto a fixed portion.

7. The device as claimed in claim 6, wherein the magnet is arranged coaxially with the gear-selection axis.

8. The device as claimed in claim 7, wherein the magnet comprises a cylindrical magnet.

* * * * *